United States Patent
Petrzilek et al.

(10) Patent No.: US 10,297,393 B2
(45) Date of Patent: May 21, 2019

(54) ULTRAHIGH VOLTAGE CAPACITOR ASSEMBLY

(71) Applicant: AVX Corporation, Fountain Inn, SC (US)

(72) Inventors: Jan Petrzilek, Usti nad Orlici (CZ); Jiri Navratil, Veseli nad Moravou (CZ); Martin Biler, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 435 days.

(21) Appl. No.: 14/657,208

(22) Filed: Mar. 13, 2015

(65) Prior Publication Data

US 2016/0268054 A1 Sep. 15, 2016

(51) Int. Cl.
| | |
|---|---|
| *H01G 9/15* | (2006.01) |
| *H01G 9/012* | (2006.01) |
| *H01G 9/08* | (2006.01) |
| H01G 9/028 | (2006.01) |

(52) U.S. Cl.
CPC ............ *H01G 9/15* (2013.01); *H01G 9/012* (2013.01); *H01G 9/08* (2013.01); *H01G 9/028* (2013.01)

(58) Field of Classification Search
CPC ............ H01G 9/10; H01G 9/028; H01G 9/15; H01G 9/048; H01G 9/025; H01G 9/012; H01G 9/0036; H01G 9/045
See application file for complete search history.

(56) References Cited

U.S. PATENT DOCUMENTS

| | | | |
|---|---|---|---|
| 3,345,545 A | 10/1967 | Bourgault et al. |
| 3,922,773 A | 12/1975 | Marien et al. |
| 4,085,435 A | 4/1978 | Galvagni |
| 4,107,762 A | 8/1978 | Shirn et al. |
| 4,479,168 A | 10/1984 | Green, Jr. |

(Continued)

FOREIGN PATENT DOCUMENTS

| | | |
|---|---|---|
| EP | 1014400 | 6/2000 |
| GB | 1069685 | 8/1965 |

(Continued)

OTHER PUBLICATIONS

Abstract of Japanese Patent No. JP1140621 dated Jun. 1, 1989.
(Continued)

*Primary Examiner* — Nguyen T Ha
(74) *Attorney, Agent, or Firm* — Dority & Manning, P.A.

(57) ABSTRACT

A capacitor assembly for use in ultrahigh voltage environments is provided. To help achieve good performance at such high voltages, a variety of aspects of the assembly are controlled in the present invention, including the number of capacitor elements, the manner in which the capacitor elements are arranged and incorporated into the assembly, and the manner in which the capacitor elements are formed. For example, the capacitor assembly contains an anode termination to which the anode lead of a first capacitor element is electrically connected and a cathode termination to which the cathode of a second capacitor element is electrically connected. To help improve the breakdown voltage properties of the assembly, the capacitor elements are electrically connected in series such that the anode lead of the second capacitor element is also electrically connected to the cathode of the first capacitor element via a conductive member.

19 Claims, 2 Drawing Sheets

(56) References Cited

U.S. PATENT DOCUMENTS

| | | | |
|---|---|---|---|
| 4,755,908 A | 7/1988 | Gardner | |
| 4,910,645 A | 3/1990 | Jonas et al. | |
| 4,945,452 A | 7/1990 | Sturmer et al. | |
| 4,959,430 A | 9/1990 | Jonas et al. | |
| 5,111,327 A | 5/1992 | Blohm et al. | |
| 5,198,968 A | 3/1993 | Galvagni | |
| 5,300,575 A | 4/1994 | Jonas et al. | |
| 5,314,606 A | 5/1994 | Irie et al. | |
| 5,357,399 A | 10/1994 | Salisbury | |
| 5,394,295 A | 2/1995 | Galvagni et al. | |
| 5,457,862 A | 10/1995 | Sakata et al. | |
| 5,473,503 A | 12/1995 | Sakata et al. | |
| 5,495,386 A | 2/1996 | Kulkarni | |
| 5,586,000 A | 12/1996 | Sakata et al. | |
| 5,608,261 A | 3/1997 | Bhattacharyya et al. | |
| 5,638,253 A | 6/1997 | Hasegawa | |
| 5,694,287 A | 12/1997 | Nishiyama et al. | |
| 5,729,428 A | 3/1998 | Sakata et al. | |
| 5,812,367 A | 9/1998 | Kudoh et al. | |
| 5,949,639 A | 9/1999 | Maeda et al. | |
| 5,951,840 A | 9/1999 | Fukaumi et al. | |
| 6,052,273 A | 4/2000 | Inoue et al. | |
| 6,188,566 B1 | 2/2001 | Aoyama | |
| 6,191,936 B1 | 2/2001 | Webber et al. | |
| 6,197,252 B1 | 3/2001 | Bishop et al. | |
| 6,322,912 B1 | 11/2001 | Fife | |
| 6,346,127 B1 | 2/2002 | Kuriyama | |
| 6,369,239 B2 | 4/2002 | Rauchschwalbe et al. | |
| 6,391,275 B1 | 5/2002 | Fife | |
| 6,416,730 B1 | 7/2002 | Fife | |
| 6,445,566 B2 | 9/2002 | Watanabe et al. | |
| 6,527,937 B2 | 3/2003 | Fife | |
| 6,528,662 B2 | 3/2003 | Jonas | |
| 6,576,099 B2 | 6/2003 | Kimmel et al. | |
| 6,592,740 B2 | 7/2003 | Fife | |
| 6,635,729 B1 | 10/2003 | Groenendaal et al. | |
| 6,639,787 B2 | 10/2003 | Kimmel et al. | |
| 6,654,228 B1* | 11/2003 | Bailey | H01G 4/232 |
| | | | 361/502 |
| 6,674,635 B1 | 1/2004 | Fife et al. | |
| 6,756,473 B2 | 6/2004 | Reuter et al. | |
| 6,808,541 B2 | 10/2004 | Maeda | |
| 6,819,546 B2 | 11/2004 | Kuriyama | |
| 6,891,016 B2 | 5/2005 | Reuter et al. | |
| 6,987,663 B2 | 1/2006 | Merker et al. | |
| 7,027,290 B1* | 4/2006 | Thrap | H01G 2/14 |
| | | | 361/274.2 |
| 7,102,016 B2 | 9/2006 | Reuter | |
| 7,116,548 B2 | 10/2006 | Satterfield, Jr. et al. | |
| 7,118,690 B2 | 10/2006 | Wessling et al. | |
| 7,139,163 B2 | 11/2006 | Sawano | |
| 7,154,740 B2 | 12/2006 | Merker et al. | |
| 7,203,056 B2* | 4/2007 | Thrap | H01G 2/14 |
| | | | 361/502 |
| 7,220,397 B2 | 5/2007 | Kimmel et al. | |
| 7,262,511 B2 | 8/2007 | Osako et al. | |
| 7,279,015 B2 | 10/2007 | Merker | |
| 7,304,832 B2 | 12/2007 | Ushio et al. | |
| 7,312,979 B2 | 12/2007 | Ishizuka et al. | |
| 7,341,705 B2 | 3/2008 | Schnitter | |
| 7,341,801 B2 | 3/2008 | Reuter et al. | |
| 7,358,326 B2 | 4/2008 | Heuer et al. | |
| 7,377,947 B2 | 5/2008 | Merker et al. | |
| 7,381,396 B2 | 6/2008 | Thomas et al. | |
| 7,411,779 B2 | 8/2008 | Merker et al. | |
| 7,419,926 B2 | 9/2008 | Schnitter et al. | |
| 7,449,588 B2 | 11/2008 | Jonas et al. | |
| 7,495,888 B2 | 2/2009 | Take | |
| 7,515,396 B2 | 4/2009 | Biler | |
| 7,554,793 B2 | 6/2009 | Chacko | |
| 7,563,290 B2 | 7/2009 | Qiu et al. | |
| 7,582,958 B2 | 9/2009 | Brailey | |
| 7,585,983 B2 | 9/2009 | Reuter et al. | |
| 7,688,571 B2 | 3/2010 | Ishizuka et al. | |
| 7,697,265 B2 | 4/2010 | Umemoto et al. | |
| 7,750,099 B2 | 7/2010 | Chikusa et al. | |
| 7,760,490 B2 | 7/2010 | Takatani et al. | |
| 7,785,493 B2 | 8/2010 | Jonas et al. | |
| 7,883,796 B2 | 2/2011 | Kida et al. | |
| 7,948,069 B2 | 5/2011 | Zhuang | |
| 7,972,534 B2 | 7/2011 | Merker et al. | |
| 7,973,180 B2 | 7/2011 | Morita et al. | |
| 7,974,077 B2 | 7/2011 | Matsuoka et al. | |
| 7,994,345 B2 | 8/2011 | Brassat et al. | |
| 8,058,135 B2 | 11/2011 | Merker et al. | |
| 8,075,640 B2 | 12/2011 | Marek et al. | |
| 8,094,434 B2 | 1/2012 | Rawal et al. | |
| 8,194,395 B2 | 6/2012 | Zednicek et al. | |
| 8,279,584 B2 | 10/2012 | Zednickova | |
| 8,293,848 B2 | 10/2012 | Plantenberg et al. | |
| 8,300,387 B1 | 10/2012 | Zednickova et al. | |
| 8,310,815 B2 | 11/2012 | Freeman et al. | |
| 8,313,538 B2 | 11/2012 | Merker et al. | |
| 8,379,372 B2 | 2/2013 | Zednicek et al. | |
| 8,576,544 B2 | 11/2013 | Rawal et al. | |
| 8,824,122 B2 | 9/2014 | Vilc et al. | |
| 8,947,857 B2 | 2/2015 | Biler et al. | |
| 2003/0105207 A1 | 6/2003 | Kleyer et al. | |
| 2004/0120099 A1* | 6/2004 | Elliott | H01G 9/008 |
| | | | 361/301.5 |
| 2005/0065352 A1 | 3/2005 | Brassat et al. | |
| 2006/0260713 A1 | 11/2006 | Pyszczek et al. | |
| 2009/0310285 A1 | 12/2009 | Reuter et al. | |
| 2010/0039748 A1 | 2/2010 | Fujii et al. | |
| 2010/0148124 A1 | 6/2010 | Reuter et al. | |
| 2010/0246098 A1* | 9/2010 | Ibata | H01G 2/06 |
| | | | 361/528 |
| 2010/0302709 A1* | 12/2010 | Dreissig | H01G 9/035 |
| | | | 361/505 |
| 2011/0157774 A1 | 6/2011 | Aitchison et al. | |
| 2011/0310531 A1* | 12/2011 | Miyachi | H01G 9/012 |
| | | | 361/532 |
| 2012/0106031 A1 | 5/2012 | Vilc et al. | |
| 2012/0113567 A1 | 5/2012 | Rawal et al. | |
| 2012/0257325 A1 | 10/2012 | Zednickova | |
| 2012/0257392 A1 | 10/2012 | Chen | |
| 2012/0307420 A1 | 12/2012 | Zednicek et al. | |
| 2013/0182374 A1* | 7/2013 | Mizukoshi | H01G 9/0029 |
| | | | 361/528 |
| 2013/0271894 A1 | 10/2013 | Biler | |
| 2014/0063691 A1* | 3/2014 | Kosuge | H01G 9/025 |
| | | | 361/525 |
| 2014/0126113 A1* | 5/2014 | Ogiwara | H01B 1/22 |
| | | | 361/523 |
| 2014/0268501 A1* | 9/2014 | Biler | H01G 9/0029 |
| | | | 361/524 |
| 2015/0049419 A1 | 2/2015 | Biler et al. | |
| 2016/0035495 A1 | 2/2016 | Komatsu et al. | |

FOREIGN PATENT DOCUMENTS

| | | |
|---|---|---|
| JP | 3127813 | 5/1991 |
| JP | 11112157 | 4/1999 |
| JP | 2005217129 | 8/2005 |
| JP | 2006278875 | 10/2006 |
| JP | 2009217759 | 9/2009 |
| JP | 5340864 | 11/2013 |
| WO | 2009030615 | 3/2009 |
| WO | 2009043648 | 4/2009 |
| WO | 2009047059 | 4/2009 |
| WO | 2009135752 | 11/2009 |
| WO | 2009141209 | 11/2009 |
| WO | 2010003874 | 1/2010 |
| WO | 2010015468 | 2/2010 |
| WO | 2010089111 | 8/2010 |
| WO | 2010102751 | 9/2010 |

OTHER PUBLICATIONS

Abstract of Japanese Patent No. JP3109712 dated May 9, 1991.
Abstract of Japanese Patent No. JP3109713 dated May 9, 1991.
Abstract of Japanese Patent No. JP3109714 dated May 9, 1991.

(56) References Cited

OTHER PUBLICATIONS

Abstract of Japanese Patent—JPH0523528, dated Feb. 2, 1993, 1 page.
Machine Translation of JP2005217129.
Machine Translation of JP2006278875.
Machine Translation of JP2005039168.
Material Safety Data Sheet from Dow Corning Corporation on 736 Heat Resistant/Sealant, Mar. 2, 2011, 8 pages.
Paper—Freeman et al., "Electrical Characterization of Polymer Tantalum Capacitors with Poly(3,4-Ethylenedioxythiophene) Cathode," Journal of the Electrochemical Society, vol. 156, No. 6, 2009, 10 pages.
Paper—Merker et al., "Conducting Polymer Dispersions for High-Capacitance Tantalum Capacitors,": CARTS Europe 2006, Sep. 2006, Bad Homburg, Germany, 6 pages.
Paper—Merker et al., "New Conducting Polymer Dispersions for Solid Electrolytic Capacitors," CARTS Europe 2005, Oct. 17-20, 2005, Prague, CZ Republic, 6 pages.
Paper—Merker et al., "Tuning Conducting Polymer Dispersions for High-CV Tantalum Capacitors," CARTS Europe Oct. 29-Nov. 1, 2007, Barcelona, Spain, 6 pages.
Paper—Simpson et al., "Advances and Applications of Inherently Conductive Polymer Technologies Based on Poly(3,4-Ethylenedioxythiophene)," 2005 AIMCAL Fall Technical Conference and $19^{th}$ International Vacuum Web Coating Conference, Oct. 16-20, 2005, Session 5: Advances in Technology, Myrtle Beach, SC, 10 pages.
Paper—Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.
Presentation—Freeman et al., "Hermetically Sealed Polymer Tantalum Capacitors," CMSE Europe 2010.
Product Information on Dow Corning® 736 Heat Resistant Sealant, 3 pages.
Product Information on Stycase™ 2651, General Purpose, Epoxy Encapsulant, from Emerson & Cuming, Jan. 22, 2007, 3 pages.
Related U.S. Patent Application Form.

* cited by examiner

ULTRAHIGH VOLTAGE CAPACITOR ASSEMBLY

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors may be formed by pressing a metal powder (e.g., tantalum) around a metal lead wire, sintering the pressed part, anodizing the sintered anode, and thereafter applying a solid electrolyte. Intrinsically conductive polymers are often employed as the solid electrolyte due to their advantageous low equivalent series resistance ("ESR") and "non-burning/non-ignition" failure mode. Such electrolytes can be formed through in situ polymerization of the monomer in the presence of a catalyst and dopant. Alternative, premade conductive polymer slurries may also be employed. Regardless of how they are formed, one problem with conductive polymer electrolytes is that they are inherently weak, which can sometimes cause them to delaminate from the dielectric during formation of the capacitor or during its operation. Furthermore, in very high voltage applications, the quality of the dielectric layer may cause failure of the part. For example, high voltage power distribution systems deliver a high voltage to the capacitor that can result in an inrush or "surge" current, particularly during a fast switch on or during an operational current spike. The peak surge current that the capacitor can withstand without failure may be in part related to the quality of the dielectric. Because the thinner areas have a lower resistance than the thicker neighboring areas, the power dissipated in the thinner areas is generally greater. Therefore, when a surge current is applied, these thinner areas may develop into weak "hot spots" that ultimately lead to degradation and breakdown of the dielectric.

As such, a need currently exists for a solid electrolytic capacitor having improved performance in very high voltage environments.

SUMMARY OF THE INVENTION

In accordance with one embodiment of the present invention, a capacitor assembly is disclosed that contains first and second capacitor elements that each contain a sintered porous anode body, a dielectric layer that overlies the anode body, and a solid electrolyte overlying the dielectric layer that includes a conductive polymer. First and second anode leads extend from the first capacitor element and the second capacitor element, respectively. A connective member electrically connects the solid electrolyte of the first capacitor element to the anode lead of the second capacitor element. The assembly also comprises a housing that defines an interior cavity within which the first and second capacitor elements are positioned and hermetically sealed, wherein the interior cavity has a gaseous atmosphere that contains an inert gas. Further, an anode termination is in electrical connection with the first anode lead of the first capacitor element and a cathode termination in electrical connection with the solid electrolyte of the second capacitor element.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor assembly for use in ultrahigh voltage environments, such as at rated voltages of about 600 volts or more. To help achieve good performance at such high voltages, a variety of aspects of the assembly are controlled in the present invention, including the number of capacitor elements, the manner in which the capacitor elements are arranged and incorporated into the assembly, and the manner in which the capacitor elements are formed. For example, the capacitor assembly contains an anode termination to which the anode lead of a first capacitor element is electrically connected and a cathode termination to which the cathode (e.g., solid electrolyte) of a second capacitor element is electrically connected. To help improve the breakdown voltage properties of the assembly, the capacitor elements are electrically connected in series such that the anode lead of the second capacitor element is electrically connected to the cathode (e.g., solid electrolyte) of the first capacitor element via a conductive member, which may be formed from a single component or multiple components. Besides being electrically connected in a certain manner, the capacitor elements are also enclosed and hermetically sealed within a housing in the presence of a gaseous atmosphere that contains an inert gas, thereby limiting the amount of oxygen and moisture supplied to the solid electrolyte of the capacitor element.

Various embodiments of the present invention will now be described in more detail.

I. Capacitor Elements

A. Anode

The anode of the capacitor elements is generally formed from a valve metal composition. The specific charge of the composition may vary, such as from about 2,000 μF*V/g to about 150,000 μF*V/g, in some embodiments from about 3,000 μF*V/g to about 70,000 μF*V/g or more, and in some embodiments, from about 4,000 to about 50,000 μF*V/g. As is known in the art, the specific charge may be determined by multiplying capacitance by the anodizing voltage employed, and then dividing this product by the weight of the anodized electrode body.

The valve metal composition generally contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al.

To form the anode body, a powder of the valve metal composition is generally employed. The powder may contain particles any of a variety of shapes, such as nodular, angular, flake, etc., as well as mixtures thereof. In particular embodiments, the particles can have a flake-like morphology in that they possess a relatively flat or platelet shape. Such particles can provide a short transmission line between the outer surface and interior of the anode and also provide a highly continuous and dense wire-to-anode connection with high conductivity. Among other things, this may help increase the breakdown voltage (voltage at which the capacitor fails) and help lower equivalent series resistance ("ESR"). The particles may also increase the specific charge of the anode when anodized at higher voltages, thereby increasing energy density. When employed, the flake particles are generally flat. The degree of flatness is generally defined by the "aspect ratio", i.e., the average diameter or width of the particles divided by the average thickness ("D/T"). For example, the aspect ratio of the particles may be from about 2 to about 100, in some embodiments from about 3 to about 50, in some embodiments, from about 4 to about 30. The particles may also have a specific surface area of from about 0.5 to about 10.0 $m^2/g$, in some embodiments from about 0.7 to about 5.0 $m^2/g$, and in some embodiments, from about 1.0 to about 4.0 $m^2/g$. The term "specific surface area" generally refers to surface area as determined by the physical gas adsorption (B.E.T.) method of Bruanauer, Emmet, and Teller, Journal of American Chemical Society, Vol. 60, 1938, p. 309, with nitrogen as the adsorption gas. The test may be conducted with a MONOSORB® Specific Surface Area Analyzer available from QUANTACHROME Corporation, Syosset, N.Y., which measures the quantity of adsorbate nitrogen gas adsorbed on a solid surface by sensing the change in thermal conductivity of a flowing mixture of adsorbate and inert carrier gas (e.g., helium).

The bulk density (also known as Scott density) is also typically from about 0.1 to about 2 grams per cubic centimeter ($g/cm^3$), in some embodiments from about 0.2 $g/cm^3$ to about 1.5 $g/cm^3$, and in some embodiments, from about 0.4 $g/cm^3$ to about 1 $g/cm^3$. "Bulk density" may be determined using a flow meter funnel and density cup. More specifically, the powder sample may be poured through the funnel into the cup until the sample completely fills and overflows the periphery of the cup, and thereafter sample may be leveled-off by a spatula, without jarring, so that it is flush with the top of the cup. The leveled sample is transferred to a balance and weighed to the nearest 0.1 gram to determine the density value. Such an apparatus is commercially available from Alcan Aluminum Corp. of Elizabeth, N.J. The particles may also have an average size (e.g., width) of from about 0.1 to about 100 micrometers, in some embodiments from about 0.5 to about 70 micrometers, and in some embodiments, from about 1 to about 50 micrometers.

Certain additional components may also be included in the powder. For example, the powder may be optionally mixed with a binder and/or lubricant to ensure that the particles adequately adhere to each other when pressed to form the anode body. The resulting powder may then be compacted to form a pellet using any conventional powder press device. The powder may be compacted around an anode lead (e.g., tantalum wire). It should be further appreciated that the anode lead may alternatively be attached (e.g., welded) to the anode body subsequent to pressing and/or sintering of the anode body.

After compaction, the resulting anode body may then be diced into any desired shape, such as square, rectangle, circle, oval, triangle, hexagon, octagon, heptagon, pentagon, etc. The anode body may also have a "fluted" shape in that it contains one or more furrows, grooves, depressions, or indentations to increase the surface to volume ratio to minimize ESR and extend the frequency response of the capacitance. The anode body may then be subjected to a heating step in which most, if not all, of any binder/lubricant are removed. For example, the anode body is typically heated by an oven that operates at a temperature of from about 150° C. to about 500° C. Alternatively, the binder/lubricant may also be removed by contacting the pellet with an aqueous solution, such as described in U.S. Pat. No. 6,197,252 to Bishop, et al. Thereafter, the porous body may be sintered to form an integral mass. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

The resulting anode may have a relatively low carbon and oxygen content. For example, the anode may have no more than about 50 ppm carbon, and in some embodiments, no more than about 10 ppm carbon. Likewise, the anode may have no more than about 3500 ppm oxygen, in some embodiments no more than about 3000 ppm oxygen, and in some embodiments, from about 500 to about 2500 ppm oxygen. Oxygen content may be measured by LECO Oxygen Analyzer and includes oxygen in natural oxide on the tantalum surface and bulk oxygen in the tantalum particles. Bulk oxygen content is controlled by period of crystalline lattice of tantalum, which is increasing linearly with increasing oxygen content in tantalum until the solubility limit is achieved. This method was described in "Critical Oxygen Content In Porous Anodes Of Solid Tantalum Capacitors", Pozdeev-Freeman et al., Journal of Materials Science: Materials In Electronics 9, (1998) 309-311 wherein X-ray diffraction analysis (XRDA) was employed to measure period of crystalline lattice of tantalum. Oxygen in sintered tantalum anodes may be limited to thin natural surface oxide, while the bulk of tantalum is practically free of oxygen.

As noted above, an anode lead may also be connected to the anode body that extends in a longitudinal direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

B. Dielectric

A dielectric also overlies or coats the anode body. The dielectric may be formed by anodically oxidizing ("anodizing") the sintered anode so that a dielectric layer is formed over and/or within the anode body. For example, a tantalum (Ta) anode body may be anodized to tantalum pentoxide ($Ta_2O_5$). Typically, anodization is performed by initially applying a solution to the anode body, such as by dipping the anode body into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode body. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode body and within its pores.

C. Solid Electrolyte

As indicated above, a solid electrolyte overlies the dielectric that generally functions as the cathode for the capacitor. The solid electrolyte contains a conductive polymer, which is typically π-conjugated and has electrical conductivity after oxidation or reduction, such as an electrical conductivity of at least about 1 μS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

Methods for forming conductive polymers, such as described above, are well known in the art. For instance, U.S. Pat. No. 6,987,663 to Merker, et al., describes various techniques for forming substituted polythiophenes from a monomeric precursor. The monomeric precursor may, for instance, have the following structure:

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

Various methods may be utilized to form the conductive polymer layer. For example, an in situ polymerized layer may be formed by chemically polymerizing monomers in the presence of an oxidative catalyst. The oxidative catalyst typically includes a transition metal cation, such as iron(III), copper(II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

The oxidative catalyst and monomer may be applied either sequentially or together to initiate the polymerization reaction. Suitable application techniques for applying these components include screen-printing, dipping, electrophoretic coating, and spraying. As an example, the monomer may initially be mixed with the oxidative catalyst to form a precursor solution. Once the mixture is formed, it may be applied to the anode part and then allowed to polymerize so that a conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer. Regardless, polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata. et al., U.S. Pat. No. 5,729,428 to Sakata, et al., and U.S. Pat. No. 5,812,367 to Kudoh, et al.

In addition to in situ application, the conductive polymer solid electrolyte may also be applied in the form of a dispersion of conductive polymer particles. One benefit of employing a dispersion is that it may minimize the presence of ionic species (e.g., $Fe^{2+}$ or $Fe^{3+}$) produced during in situ polymerization, which can cause dielectric breakdown under high electric field due to ionic migration. Thus, by applying the conductive polymer as a dispersion rather through in situ polymerization, the resulting capacitor may exhibit a relatively high "breakdown voltage." To enable good impregnation of the anode, the particles employed in the dispersion typically have a small size, such as an average size (e.g., diameter) of from about 1 to about 150 nanometers, in some embodiments from about 2 to about 50 nanometers, and in some embodiments, from about 5 to about 40 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

The dispersion also generally contains a counterion that enhances the stability of the particles. That is, the conductive polymer (e.g., polythiophene or derivative thereof) typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counterions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in the dispersion and in the resulting layer is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization. In addition to conductive polymer(s) and counterion(s), the dispersion may also contain one or more binders, dispersion agents, fillers, adhesives, crosslinking agents, etc.

The polymeric dispersion may be applied using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas. Once applied, the layer may be dried and/or washed. One or more additional layers may also be formed in this manner to achieve the desired thickness. Typically, the total thickness of the layer(s) formed by this particle dispersion is from about 1 to about 50 µm, and in some embodiments from about 5 to about 20 µm. The weight ratio of counterions to conductive polymers is likewise from about 0.5:1 to about 50:1, in some embodiments from about 1:1 to about 30:1, and in some embodiments, from about 2:1 to about 20:1.

If desired, a hydroxyl-functional nonionic polymer may also be included in the solid electrolyte. The term "hydroxy-functional" generally means that the compound contains at least one hydroxyl functional group or is capable of possessing such a functional group in the presence of a solvent. Without intending to be limited by theory, it is believed that hydroxy-functional nonionic polymers can improve the degree of contact between the conductive polymer and the surface of the internal dielectric, which is typically relatively smooth in nature as a result of higher forming voltages. This unexpectedly increases the breakdown voltage and wet-to-dry capacitance of the resulting capacitor. Furthermore, it is believed that the use of a hydroxy-functional polymer with a certain molecular weight can also minimize the likelihood of chemical decomposition at high voltages. For instance, the molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed for this purpose. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans), which are produced by polyaddition of ethylene oxide, propylene oxide or tetrahydrofuran onto water. The polyalkylene ethers may be prepared by polycondensation reactions from diols or polyols. The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the diols mentioned. In addition, polyhydric alcohols may also be used in the polymerization reaction, including for example glycerol, di- and polyglycerol, trimethylolpropane, pentaerythritol or sorbitol.

In addition to those noted above, other hydroxy-functional nonionic polymers may also be employed in the present invention. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10-16}$—$(O$—$C_2H_4)_{1-25}$—$OH$ (e.g., octaethylene glycol monododecyl ether and pentaethylene glycol monododecyl ether); polyoxypropylene glycol alkyl ethers having the general formula: $CH_3$—$(CH_2)_{10-16}$—$(O$—$C_3H_6)_{1-25}$—$OH$; polyoxyethylene glycol octylphenol ethers having the following general formula: $C_8H_{17}$—$(C_6H_4)$—$(O$—$C_2H_4)_{1-25}$—$OH$ (e.g., Triton™ X-100); polyoxyethylene glycol alkylphenol ethers having the following general formula: $C_9H_{19}$—$(C_6H_4)$—$(O$—$C_2H_4)_{1-25}$—$OH$ (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether);

block copolymers of polyethylene glycol and polypropylene glycol (e.g., Poloxamers); and so forth, as well as mixtures thereof.

The hydroxy-functional nonionic polymer may be incorporated into the solid electrolyte in a variety of different ways. In certain embodiments, for instance, the nonionic polymer may simply be incorporated into any conductive polymer layer(s) formed by a method as described above (e.g., in situ polymerization or pre-polymerized particle dispersion). In other embodiments, however, the nonionic polymer may be applied after the initial polymer layer(s) are formed.

D. External Polymer Coating

Although not required, an external polymer coating may be applied to the anode body and overlie the solid electrolyte. The external polymer coating generally contains one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc.

E. Other Components of the Capacitor

If desired, the capacitor may also contain other layers as is known in the art. For example, a protective coating may optionally be formed between the dielectric and solid electrolyte, such as one made of a relatively insulative resinous material (natural or synthetic), such as shellac resins. These and other protective coating materials are described in more detail U.S. Pat. No. 6,674,635 to Fife, et al. If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

Generally speaking, the capacitor element is substantially free of resins (e.g., epoxy resins) that encapsulate the capacitor element as are often employed in conventional solid electrolytic capacitors. Among other things, the encapsulation of the capacitor element can lead to instability in extreme environments, i.e., high temperature (e.g., above about 175° C.) and/or high voltage (e.g., above about 500 volts).

II. Housing

As indicated above, at least two capacitor elements are hermetically sealed within a housing. Hermetic sealing typically occurs in the presence of a gaseous atmosphere that contains at least one inert gas so as to inhibit oxidation of the solid electrolyte during use. The inert gas may include, for instance, nitrogen, helium, argon, xenon, neon, krypton, radon, and so forth, as well as mixtures thereof. Typically, inert gases constitute the majority of the atmosphere within the housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the housing. For example, the moisture content (expressed in terms of relatively humidity) may be about 10% or less, in some embodiments about 5% or less, in some embodiments about 1% or less, and in some embodiments, from about 0.01 to about 5%.

Any of a variety of different materials may be used to form the housing, such as metals, plastics, ceramics, and so forth. In one embodiment, for example, the housing includes one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In another embodiment, the housing may include one or more layers of a ceramic material, such as aluminum nitride, aluminum oxide, silicon oxide, magnesium oxide, calcium oxide, glass, etc., as well as combinations thereof.

The capacitor elements may be attached to the housing using any of a variety of different techniques. For example, although by no means required, the capacitor elements may be attached to the housing in such a manner that the terminations are formed external to the housing for subsequent integration into a circuit. The particular configuration of the terminations may depend on the intended application. In one embodiment, for example, the capacitor assembly may be formed so that it is surface mountable, and yet still mechanically robust. For example, the anode lead of one capacitor element and the cathode of another capacitor element may be electrically connected to external, surface mountable terminations (e.g., pads, sheets, plates, frames, etc.), which may extend through the housing to connect with the capacitor. The thickness or height of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. If desired, the surface of the terminations may be electroplated with nickel, silver, gold, tin, etc. as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

Figure 1:
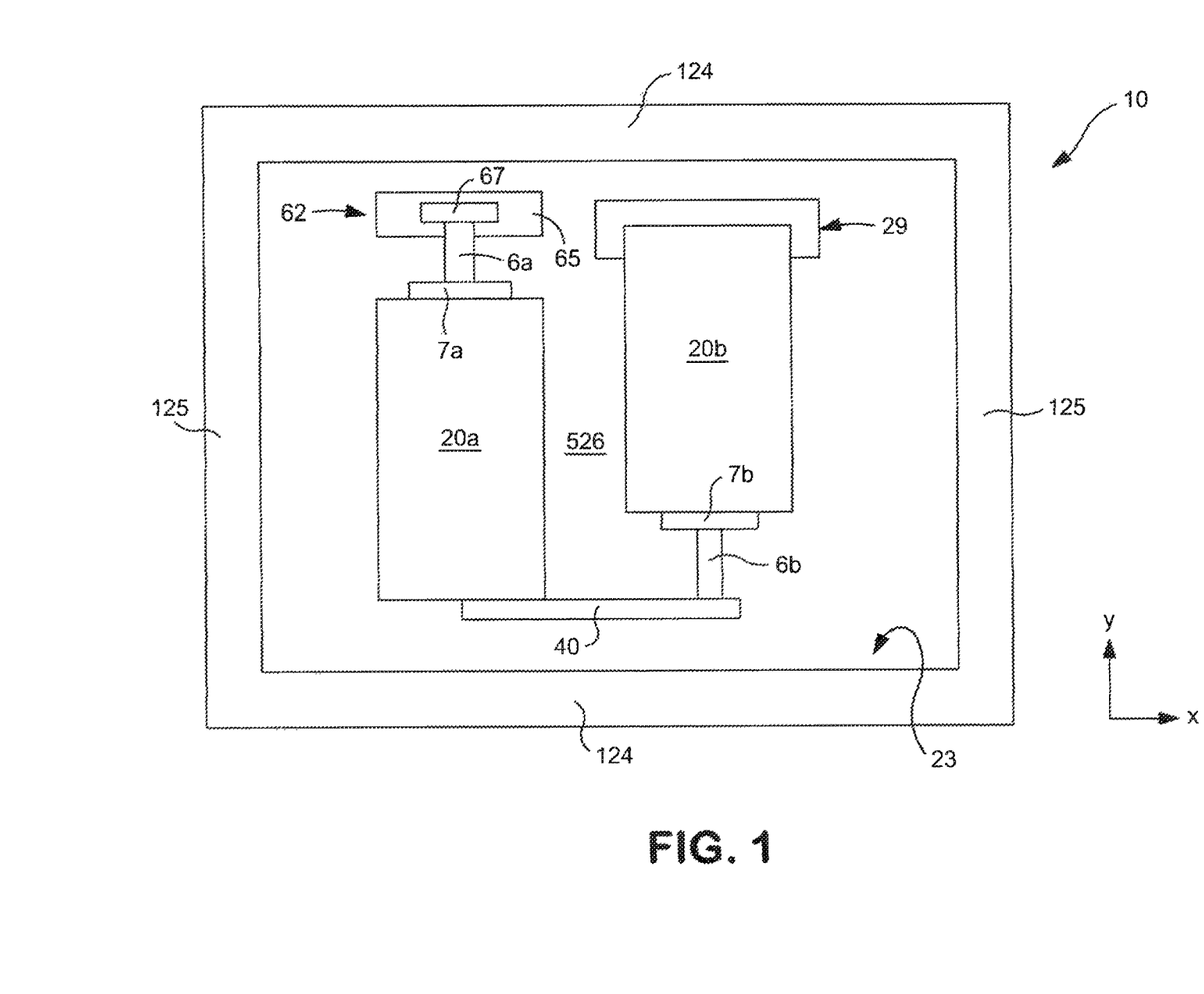
FIG. 1 is top view of one embodiment of the capacitor assembly of the present invention.

Referring to FIG. 1, for example one particular embodiment of a capacitor assembly 10 is shown that contains two capacitor elements, which will now be described in more detail. More particularly, the capacitor assembly 10 includes a first capacitor element 20a and second capacitor element 20b connected in series. In this embodiment, the capacitor elements are aligned so that their major surfaces are in a horizontal configuration. That is, a major surface of the capacitor element 20a defined by its width (−x direction) and length (−y direction) is positioned adjacent to a corresponding major surface of the capacitor element 20b. Thus, the major surfaces are generally coplanar. Alternatively, the capacitor elements may be arranged so that their major surfaces are not coplanar, but perpendicular to each other in a certain direction, such as the −z direction or the −x direction. Of course, the capacitor elements need not extend in the same direction.

The housing of the capacitor assembly 10 includes an outer wall 23 and opposing sidewalls 124 and 125 between which a cavity 526 is formed that includes the capacitor elements. The outer wall 23 and sidewalls 124 and 125 may be formed from one or more layers of a metal, plastic, or ceramic material such as described above. As described above, the capacitor assembly also contains external terminations (not shown) to which the anode leads and cathode of respective capacitor elements are electrically connected in series. Conductive members may be employed within the interior cavity of the housing to facilitate the formation of the external terminations in a mechanically stable manner. For example, referring again to FIG. 1, the capacitor assembly 10 may include a first conductive member 62 that is formed from a first and a second portion 65. The first portion 67 and second portion 65 may be integral or separate pieces that are connected together, either directly or via an additional conductive member (e.g., metal). In the illustrated embodiment, the second portion 65 is provided in a plane that is generally parallel to a lateral direction in which the lead 6a extends (e.g., −y direction). The first portion 67 is "upstanding" in the sense that it is provided in a plane that is generally perpendicular the lateral direction in which the lead 6a extends. In this manner, the first portion 67 can limit movement of the lead 6a in the horizontal direction to enhance surface contact and mechanical stability during use. If desired, an insulative material 7a (e.g. Teflon™ washer) may be employed around the lead 6a. The first portion 67 may possess a mounting region (not shown) that is connected to the anode lead 6a. The region may have a "U-shape" for further enhancing surface contact and mechanical stability of the lead 6a.

A second conductive member 29 may also be provided that is electrically connected to a cathode (e.g., solid electrolyte) of a second capacitor element 20b. As shown, the second capacitor element 20b may also contain an insulative material 7b and an anode lead 6b, which is oriented in a direction opposite to that of the anode lead 6a of the first capacitor element 20a. The second conductive member 29 may be provided in a plane that is generally parallel to a lateral direction in which the lead 6b extends (e.g., −y direction). To connect the capacitor elements in series, a connective member 40 may also be employed that is electrically connected to the cathode (e.g., solid electrolyte) of the first capacitor element 20a and the anode lead 6b of the second capacitor element 20b.

Attachment of the capacitor elements may generally be accomplished using any of a variety of known techniques, such as welding, laser welding, conductive adhesives, etc. In one particular embodiment, for example, the first conductive member 62 is laser welded to the anode lead 6a and the second conductive member 29 is attached to the second capacitor element 20b with an adhesive. Likewise, the connective member 40 may be connected to the first capacitor element 20a with an adhesive and laser welded to the anode lead 6b of the second capacitor element 20b. When employed, conductive adhesives may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al.

Although not depicted in detail, the capacitor assembly contains external anode and cathode terminations, which may be formed by the conductive members themselves or by separate members attached thereto. In FIG. 1, for instance, the first conductive member 62 may extend through the outer wall 23 to form the external anode termination. Alternatively, a separate conductive trace (not shown) may be attached to the first conductive member 62 that extends through the wall 23 and either forms the anode termination or is connected to an additional conductive member that serves as the anode termination. Similarly, the second conductive member 29 may extend through the outer wall 23 to form the external cathode termination, or a separate conductive trace (not shown) may be attached to the second conductive member 29 that extends through the wall 23 and either forms the cathode termination or is connected to an additional conductive member that serves as the cathode termination. Of course, the present invention is by no means limited to the use of conductive traces for forming the desired terminations.

Once connected in the desired manner, the resulting package is hermetically sealed as described above. Referring again to FIG. 1, for instance, the housing may also include a lid (not shown) that is placed on an upper surface of side walls 124 and 125 after the capacitor elements are positioned within the housing. The lid may be formed from a ceramic, metal (e.g., iron, copper, nickel, cobalt, etc., as well as alloys thereof), plastic, and so forth. If desired, a sealing member (not shown) may be disposed between the lid and the side walls 124 and 125 to help provide a good seal. In one embodiment, for example, the sealing member may include a glass-to-metal seal, Kovar® ring (Goodfellow Camridge, Ltd.), etc. The height of the side walls is generally such that the lid does not contact any surface of the capacitor elements so that they are not contaminated. When placed in the desired position, the lid is hermetically sealed to the sidewalls 124 and 125 using known techniques, such as welding (e.g., resistance welding, laser welding, etc.), soldering, etc. Hermetic sealing generally occurs in the presence of inert gases as described above so that the resulting assembly is substantially free of reactive gases, such as oxygen or water vapor.

Figure 2:
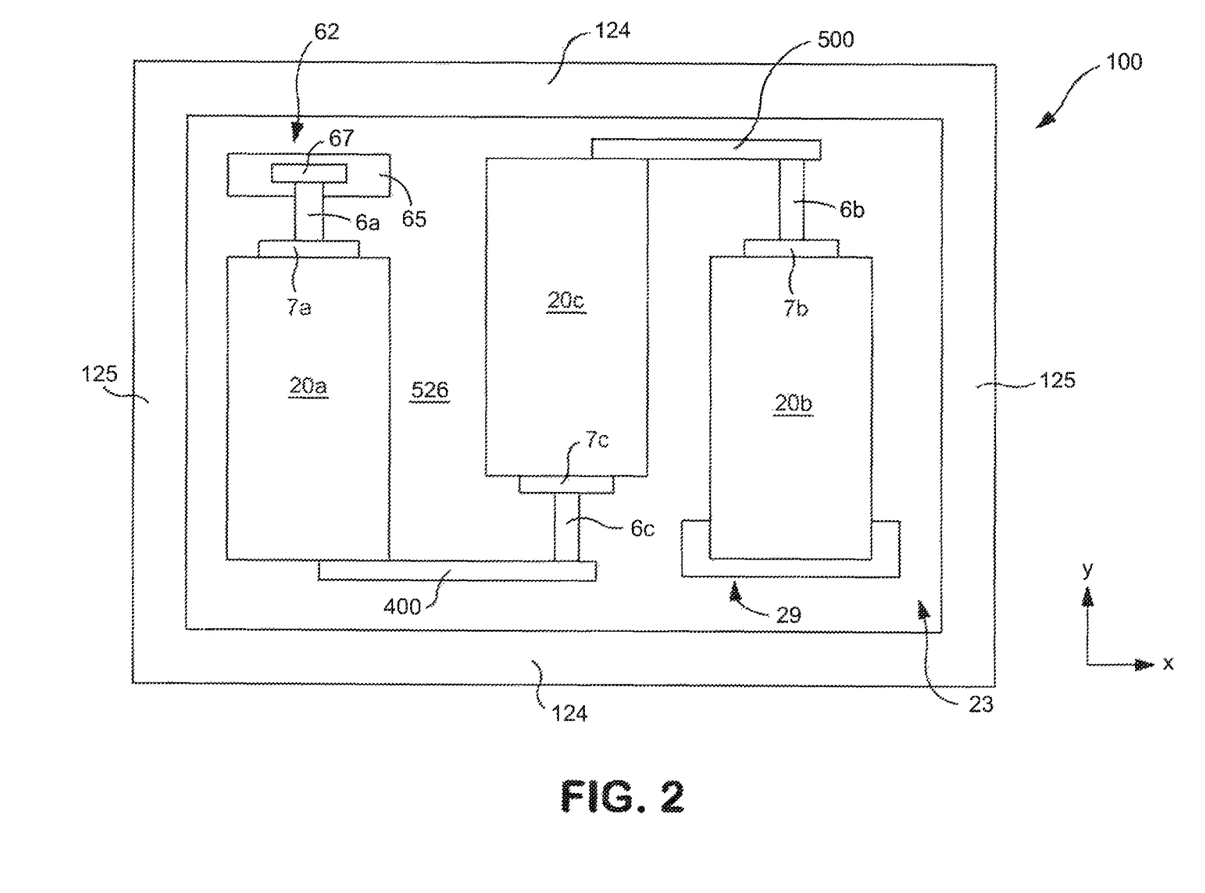
FIG. 2 is a top view of another embodiment of the capacitor assembly of the present invention.

In the embodiment shown in FIG. 1, the capacitor assembly includes 2 capacitor elements. However, as noted above, any number of capacitor elements may generally be employed in the present invention, such as 2 or more, in some embodiments from 2 to 10, and in some embodiments, from 3 to 8. Referring to FIG. 2, for instance, one embodiment of a capacitor assembly 100 is shown that contains a third capacitor element 20c positioned between the first and second capacitor elements 20a and 20b and connected thereto in series. The capacitor element 20a is connected to the first conductive member 62 and the capacitor element 20b is connected to the second conductive member 29 in the manner described above, except that the anode lead 6b of the second capacitor element 20b is oriented in the same direction as the anode lead 6a of the first capacitor element 20a.

However, contrary to the embodiment shown in FIG. 1 in which the connective member used to connect the capacitor elements is formed from a single component, the connective member of FIG. 2 is formed from multiple components. That is, the connective member is formed from a first portion 400 and second portion 500, as well as the third capacitor element 20c itself. More particularly, the third capacitor element 20c contains an insulative material 7c and anode lead 6c, which is oriented in a direction opposite to that of the anode leads 6a and 6b. The first portion 400 of the connective member is electrically connected to the cathode (e.g., solid electrolyte) of the first capacitor element 20a and the anode lead 6c of the third capacitor element 20c. The second portion 500 of the connective member is likewise electrically connected to the cathode (e.g., solid electrolyte) of the third capacitor element 20c and the anode lead 6b of the second capacitor element 20b. In one particular embodiment, the first conductive member 62 is laser welded to the anode lead 6a and the second conductive member 29 is attached to the second capacitor element 20b with an adhesive. Likewise, the first portion 400 may be connected to the first capacitor element 20a with an adhesive and laser welded to the anode lead 6c of the third capacitor element 20b, and the second portion 500 may be connected to the third capacitor element 20c with an adhesive and laser welded to the anode lead 6b of the second capacitor element 20b.

Regardless of its particular configuration, the capacitor assembly of the present invention may exhibit excellent electrical properties even when exposed to high voltage environments. For example, the capacitor assembly may exhibit a relatively high "breakdown voltage" (voltage at which the capacitor fails), such as about 500 volts or more, in some embodiments about 600 volts or more, in some embodiments about 700 volts or more, and in some embodiments, from about 750 volts to about 1500 volts. Breakdown may be determined by charging a capacitor with 0.1 mAmps (charging slope dU/dt=10) and then measuring the voltage at which the applied voltage decreases more than 10%—i.e., the breakdown voltage. This test is typically performed at room temperature. Likewise, the capacitor may also be able to withstand relatively high surge currents, which is also common in high voltage applications. The peak surge current may, for example, about 2 times the rated voltage or more, such as range from about 40 Amps or more, in some embodiments about 60 Amps or more, and in some embodiments, and in some embodiments, from about 120 Amps to about 250 Amps.

The present invention may be better understood by reference to the following example.

Test Methods

Equivalent Series Resistance (ESR)

Equivalence series resistance may be measured using an Agilent E4980A Precision LCR Meter with Kelvin Leads 2.2 volt DC bias and a 0.5 volt peak to peak sinusoidal signal. The operating frequency may 100 kHz and the temperature may be 23° C.±2° C.

Capacitance

The capacitance may be measured using an Agilent E4980A Precision LCR Meter with Kelvin Leads with 2.2 volt DC bias and a 0.5 volt peak to peak sinusoidal signal. The operating frequency may be 120 Hz and the temperature may be 23° C.±2° C.

EXAMPLE 1

9,000 μFV/g tantalum powder was used to form anode samples. Each anode sample was embedded with a tantalum wire, sintered at 1800° C., and pressed to a density of 5.3 g/cm³. The resulting pellets had a size of 4.15×3.70×2.00 mm. The pellets were anodized to 315V in a liquid electrolyte to form a dielectric layer. A conductive polymer coating was then formed by dipping the anode into a dispersed poly(3,4-ethylenedioxythiophene) having a solids content 1.1% (Clevios™ K, Heraeus). Upon coating, the part was then dried at 125° C. for 20 minutes. This process was repeated 10 times. Thereafter, the part was dipped into a dispersed poly(3,4-ethylenedioxythiophene) having a solids content 2% and dried at 125° C. for 20 minutes. This process was repeated 8 times. The parts were then dipped into a graphite dispersion and dried. Finally, the parts were dipped into a silver dispersion and dried.

A copper-based leadframe material was used to finish the assembly process of capacitor elements into to a ceramic housing. As shown in FIG. 2, the capacitor assembly included 3 capacitor elements connected in series. The anode lead of one capacitor element and the cathode of another capacitor element were electrically connected to external, surface mountable terminations, which extended through the ceramic housing to connect with the capacitor. The adhesive employed for all connections was a silver paste. The assembly was then loaded in a convection oven to solder the paste. After that, the welding employed for the anode connection was a resistance welding and an energy of 300 W was applied between the leadframe portions and ceramic housing gold plated solder pad during 100 ms. After that, a polymeric restraint material was applied over the top of the anode and cathode portions of the capacitor element and was dried at 150° C. for 2 hours. A Kovar® lid was placed over the top of the container, closely on the seal ring of the ceramic. The resulting assembly was placed into a welding chamber and purged with nitrogen gas before seam welding between the seal ring and the lid was performed. Multiple parts (15) of 1 μF/750V capacitors were made in this manner.

EXAMPLE 2

The capacitor elements were formed in the same manner described above in Example 1. The finished parts were also assembled as shown in FIG. 2 (3 capacitor elements connected in series), but without the use of nitrogen inert gas before the seam welding process. The resulting assembly was placed into a welding chamber and purged with air before seam welding between the seal ring and the lid was performed. Multiple parts (15) of 1 μF/750V capacitors were made in this manner.

The parts of Examples 1 and 2 were then tested for electrical performance (i.e., capacitance ("CAP") and equivalent series resistance ("ESR")), during storage testing at a temperature of 150° C. The median results are shown below.

|  | Example 1 | | Example 2 | |
| --- | --- | --- | --- | --- |
| time [h] | CAP (μF) | ESR (ohms) | CAP (μF) | ESR (ohms) |
| 0 | 0.98 | 0.3 | 0.99 | 0.3 |
| 150 | 0.98 | 0.4 | 0.96 | 0.6 |
| 250 | 0.97 | 0.4 | 0.96 | 1.0 |
| 500 | 0.97 | 0.4 | 0.95 | 3.9 |
| 750 | 0.96 | 0.5 | 0.82 | 13.3 |
| 1000 | 0.96 | 0.5 | Open circuit | |
| 1500 | 0.96 | 0.5 | — | |
| 2000 | 0.96 | 0.6 | — | |
| 2500 | 0.96 | 0.6 | — | |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
   first and second capacitor elements that each contain a sintered porous anode body, a dielectric layer that overlies the anode body, and a solid electrolyte overlying the dielectric layer that includes a conductive polymer, wherein first and second anode leads extend from the first capacitor element and the second capacitor element, respectively;
   a connective member that electrically connects the solid electrolyte of the first capacitor element to the anode lead of the second capacitor element;
   a housing that defines an interior cavity within which the first and second capacitor elements are positioned and hermetically sealed, wherein the interior cavity has a gaseous atmosphere that contains an inert gas;
   an external anode termination that is in electrical connection with the first anode lead of the first capacitor element; and
   an external cathode termination that is in electrical connection with the solid electrolyte of the second capacitor element.

2. The capacitor assembly of claim 1, wherein inert gases constitute from about 50 wt. % to 100 wt. % of the gaseous atmosphere.

3. The capacitor assembly of claim 1, wherein the housing is formed from a metal, plastic, ceramic, or a combination thereof.

4. The capacitor assembly of claim 1, further comprising a first conductive member that contains a first portion positioned generally perpendicular to a lateral direction of the first anode lead and connected thereto.

5. The capacitor assembly of claim 4, wherein the first conductive member further contains a second portion positioned generally parallel to the lateral direction in which the first anode lead extends.

6. The capacitor assembly of claim 4, wherein the first conductive member is connected to the anode termination.

7. The capacitor assembly of claim 1, further comprising a second conductive member that is electrically connected to the solid electrolyte of the second capacitor element.

8. The capacitor assembly of claim 7, Wherein the second conductive member is connected to the cathode termination.

9. The capacitor assembly of claim 1, wherein the first anode lead and the second lead are oriented in opposite directions.

10. The capacitor assembly of claim 1, wherein the capacitor assembly includes from 2 to 10 capacitor elements.

11. The capacitor assembly of claim 1, further comprising:
    a third capacitor element that is positioned between the first and second capacitor elements, the third capacitor element containing a sintered porous anode body, a dielectric layer that overlies the anode body, and a solid electrolyte overlying the dielectric layer that includes a conductive polymer; and
    a third anode lead extending from the third capacitor element.

12. The capacitor assembly of claim 11, wherein the connective member is formed from a first portion, second portion, and the third capacitor element, the first portion electrically connecting the solid electrolyte of the first capacitor element and the third anode lead of the third capacitor element, and the second portion electrically connecting the solid electrolyte of the third capacitor element with the second anode lead of the second capacitor element.

13. The capacitor assembly of claim 11, wherein the first anode lead and the second anode lead are oriented in the same direction.

14. The capacitor assembly of claim 13, wherein the first anode lead and the third anode lead are oriented in opposite directions.

15. The capacitor assembly of claim 1, wherein the anode body is formed from a powder that contains tantalum, niobium, or an electrically conductive oxide thereof.

16. The capacitor assembly of claim 1, wherein the conductive polymer is a substituted polythiophene.

17. The capacitor assembly of claim 16, wherein the substituted polythiophene is poly(3,4-ethylenedioxythiophene).

18. The capacitor assembly of claim 1, wherein the solid electrolyte comprises a plurality of pre-polymerized conductive polymer particles.

19. The capacitor assembly of any of the foregoing claims, wherein the assembly exhibits a breakdown voltage of about 600 volts or more.

* * * * *